(12) United States Patent
Hoymann et al.

(10) Patent No.: US 9,204,314 B2
(45) Date of Patent: Dec. 1, 2015

(54) NUMBERING OF AUTOMATIC REPEAT REQUEST PROCESSES

(75) Inventors: Christian Hoymann, Aachen (DE); Henning Wiemann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 200 days.

(21) Appl. No.: 13/640,778

(22) PCT Filed: Jun. 28, 2010

(86) PCT No.: PCT/EP2010/059132
§ 371 (c)(1),
(2), (4) Date: Nov. 12, 2012

(87) PCT Pub. No.: WO2011/127993
PCT Pub. Date: Oct. 20, 2011

(65) Prior Publication Data
US 2013/0107735 A1     May 2, 2013

Related U.S. Application Data

(60) Provisional application No. 61/324,391, filed on Apr. 15, 2010.

(51) Int. Cl.
*H04W 24/00* (2009.01)
*H04L 1/18* (2006.01)
*H04L 1/00* (2006.01)

(52) U.S. Cl.
CPC ............. *H04W 24/00* (2013.01); *H04L 1/1822* (2013.01); *H04L 2001/0097* (2013.01)

(58) Field of Classification Search
CPC ............... H04L 1/1822; H04L 2001/0097; H04W 24/00

USPC .......................................... 370/252, 277, 310
See application file for complete search history.

(56) References Cited

U.S. PATENT DOCUMENTS

2005/0122898 A1*    6/2005    Jang et al. ..................... 370/218

FOREIGN PATENT DOCUMENTS

WO     2011020922 A1     2/2011
WO     2013166964    * 11/2013

OTHER PUBLICATIONS

3rd Generation Partnership Project. "UL/DL HARQ Timing for Backhaul." 3GPP TSG-RAN WG1 Meeting #60bis, R1-102044, Beijing, China, Apr. 12-16, 2010.
(Continued)

*Primary Examiner* — Donald Mills
*Assistant Examiner* — Henry Baron
(74) *Attorney, Agent, or Firm* — Coats & Bennett, P.L.L.C.

(57) ABSTRACT

A method (200) for data transmission from a sender (110) to a receiver (120), wherein the data transmission is performed in predefined time intervals by associated transmission processes. The sender (110) is adapted to perform a subsequent transmission for the associated process in a time interval after one round trip time (502). Specific transmissions are performed among the transmissions, wherein the specific transmissions are limited to a subset of the time intervals, the subset being smaller than the number of all time intervals in a round trip time (502). The method (200) comprises the steps of determining (230) a maximum number of specific transmissions within a round trip time (502), specifying (240) a number of associated processes for the specific transmissions, wherein the specified number is the maximum number, and associating (250) the processes for the specific transmissions with the specific transmissions.

22 Claims, 3 Drawing Sheets

(56) References Cited

OTHER PUBLICATIONS

3rd Generation Partnership Project. "Discussion of UL Un HARQ RTTs." 3GPP TSG-RAN WG1 #61bis, Tdoc R1-103515, Dresden, Germany, Jun. 28-Jul. 2, 2010.

Third Generation Partnership Project. Technical Specification Group Radio Access Network; Evolved Universal Terrestrial Radio Access (E-UTRA); Radio Resource Control (RRC): Protocol specification (Release 9); 3GPP TS 36.331 V9.1.0; Dec. 2009; pp. 1-233; Sophia Antipolis, Valbonne France.

Third Generation Partnership Project. "Technical Specification Group Radio Access Network; Evolved Universal Terrestrial Radio Access (E-UTRA); Physical layer procedures (Release 9)." 3GPP TS 36.213 V9.1.0; Mar. 2010; pp. 1-79; Sophia Antipolis, Valbonne France.

Third Generation Partnership Project. "Un HARQ timing for FDD." 3GPP TSG-RAN WG1 #60bis Tdoc R1-101749; Beijing, China, Apr. 12-16, 2010; pp. 1-4.

* cited by examiner

NUMBERING OF AUTOMATIC REPEAT REQUEST PROCESSES

TECHNICAL FIELD

The invention relates to a method for data transmission from a sender to a receiver.

The invention also relates to a sender.

Beyond this, the invention relates to a receiver.

The invention further relates to a data carrier comprising software.

BACKGROUND

In a "hybrid automatic repeat request" (HARQ) protocol for a communication system, a part of data (which had been transmitted properly) from an earlier transmission of a communication message may be combined with another part of data which had not been transmitted properly previously from a later re-transmission of the communication message. HARQ may be considered as a variation of an ARQ (automatic repeat request) protocol error control method.

A given HARQ process in LTE (Long Term Evolution of $3^{rd}$ Generation Partnership telecommunication systems) operates according to a stop-and-wait ARQ protocol. Each HARQ process corresponds to a subframe (or transmission time interval, TTI) where transmissions of that process may occur. Uplink transmissions and downlink feedback are associated to each other, for instance for sending ARQ responses, wherein corresponding transmissions are shifted by, e.g., four subframes with respect to the associated transmission in the opposite direction. In order to allow for continuous transmission the number of HARQ processes is equal to the number of subframes within one round-trip time (RTT).

In LTE FDD (frequency division duplex) all subframes of a radio frame are either UL (uplink) or DL (downlink) subframes. Transmission timing is defined so that the resulting RTT is 8 ms, hence 8 UL HARQ processes are needed for continuous transmission (3GPP TS 36.213, Physical Layer Procedures, V 9.1.0).

In LTE TDD (time division duplex) subframes of a radio frame are either UL or DL subframes depending on the TDD configuration. The transmission timing is defined so that the RTT depends on the TDD configuration and on the subframe number (see Table 8.1 of 3GPP TS 36.213, Physical Layer Procedures, V 9.1.0).

Figure 1:
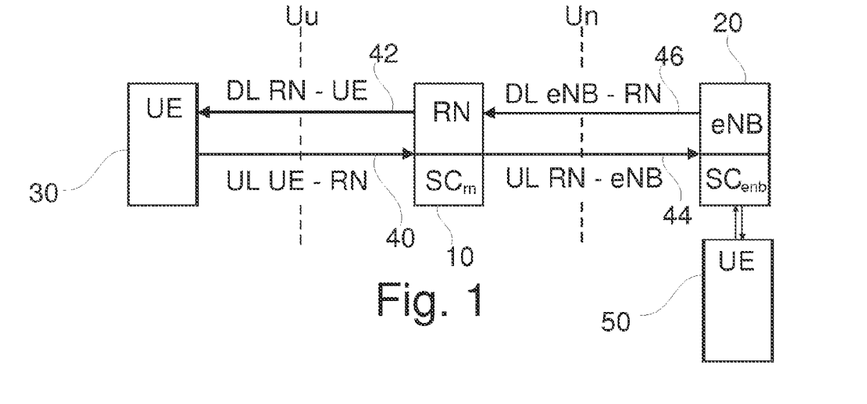
FIG. 1 illustrates a communication scheme between a user equipment, a relay node, and a radio access node.

FIG. 1 shows a relay scenario. A scheduler $SC_{enb}$ in a radio access node eNB 20 schedules the data transmissions and allocates transmission resources to the relay nodes (RN) 10 (only one is shown in FIG. 1) and user equipments (UE) 50 in its coverage area. The eNB 20 may be in contact with some UEs 50 (only one is shown in FIG. 1) directly without a RN 10. This connection is indicated only schematically in FIG. 1. Another scheduler $SC_m$ is located in each relay node 10 and it allocates transmission resources to its associated UEs 30. Generally, a $SC_m$ may only allocate resources for Uu transmission, i.e. transmission between UE 30 and RN 10, that are not scheduled for Un transmission, i.e. transmission between eNB 20 and RN 10. An interface between the UE 50 and the eNB 20 or the UE 30 and the Relay Node 10 may be denoted as Uu interface. An interface between the relay node 10 and the donor eNodeB 20 may be denoted as a Un interface.

Referring to FIG. 1, the user equipment 30 (such as a mobile phone) can communicate in an uplink direction via a communication link 40 with the relay node 10. Furthermore, it is possible that the relay node 10 communicates with the user equipment 30 in a downlink connection via a communication link 42. Furthermore, the relay node 10 can communicate with the radio access node 20 in an uplink direction via a communication link 44. The radio access node 20 can communicate with the relay node 10 in a downlink direction via a communication link 46.

When supporting relays, relay node subframes are either allocated to the backhaul (eNB-RN or Un) or to the access link (RN-UE or Uu). The Un HARQ processes operate on the Un subframes and the Uu HARQ processes generally operate on the Uu subframes although DL control signaling for Uu HARQ processes may also occur in DL Un subframes, e.g. in a corresponding control region of MBSFN (Multicast Broadcast Single Frequency Network) subframes. If not all subframes are declared as Un subframe, less Un transmission opportunities occur within one HARQ RTT and consequently, less HARQ processes are required to fully utilize the link.

In LTE systems, DL Un subframes are MBSFN subframes, which are restricted in DL to subframes 1, 2, 3, 6, 7, 8 in FDD and 2, 3, 4, 7, 8, 9 in TDD. In DL, non-MBSFN subframes can thus not be Un subframes. The corresponding UL subframes cannot be Un either although in UL there are no MBSFN subframes. MBSFN subframes are either configured with a 10 ms period (one radio frame) using a 6-bit bitmap or with a 40-ms period (four radio frames) using a 24-bit bitmap (3GPP TS 36.331, Radio Resource Control (RRC), V 9.1.0). According to the configuration, subframes may be individually allocated by the scheduler.

Un subframes are configured by the eNB 20. Hence the number of Un subframes as well as the location and the period depends on the actual Un subframe configuration. The transmission timing and the number of Un UL HARQ processes cannot be pre-defined as today or would result in unsuitably large configuration tables.

If the same number of processes is configured that would be required without relaying according to the synchronous HARQ protocol used for the present LTE uplink, HARQ processes would not be served in every HARQ RTT. This would result in larger delays as retransmissions of a HARQ process can be performed only after all other HARQ process have been served, which according to the above explanation, takes longer than the HARQ RTT.

Correspondingly, ARQ technology may suffer from an inflexible or inefficient management of ARQ processes.

SUMMARY

It is an object of the invention to provide a data transmission system efficiently managing transmission processes.

In order to achieve the object defined above, a method for data transmission from a sender to a receiver, a sender, a receiver, and a data carrier comprising software according to the independent claims are provided.

According to an embodiment of the invention, a method for data transmission from a sender to a receiver is provided. The data transmission is performed in predefined time intervals by associated transmission processes. The sender is adapted to perform a subsequent transmission for the associated process in a time interval after one round trip time. Specific transmissions are performed among the transmissions, wherein the specific transmissions are limited to a subset of the time intervals. The subset is smaller than the number of all time intervals in a round trip time. The method comprises the steps of determining a maximum number of specific transmissions within a round trip time. The method further comprises specifying a number of associated processes for the specific transmissions, wherein the specified number is the maximum number. The method also comprises associating the processes for the specific transmissions with the specific transmissions.

According to another embodiment of the invention, a sender is provided which comprises a transmitter for sending data in predefined time intervals. The sender further comprises a processor adapted to identify time intervals among the predefined time intervals which are attributed to specific transmissions. The processor comprises a unit for determining a maximum number of specific transmissions within a round trip time. The sender further comprises a management unit adapted to specify a number of associated processes for the specific transmissions, wherein the specified number is the maximum number, and to associate the processes for the specific transmissions with the specific transmissions.

According to another embodiment of the invention, a receiver is provided which comprises a reception unit for receiving data in predefined time intervals. The receiver further comprises a processor adapted to identify time intervals among the predefined time intervals which are attributed to specific transmissions. The processor comprises a unit for determining a maximum number of specific transmissions within a round trip time. The receiver further comprises a management unit adapted to specify a number of associated processes for the specific transmissions, wherein the specified number is the maximum number, and to associate the processes for the specific transmissions with the specific transmissions.

An embodiment of the invention may be embodied in software, for instance on a data carrier, adapted to execute the above method when loaded into a sender or receiver.

Particularly, a program element (for instance a software routine, in source code or in executable code) is provided, which, when being executed by a processor (such as a microprocessor or a CPU), is adapted to control or carry out a method having the above mentioned features.

The aspects defined above and further aspects of the invention are apparent from the examples of embodiment to be described hereinafter and are explained with reference to these examples of embodiment.

BRIEF DESCRIPTION OF THE DRAWINGS

Embodiments of the invention will be described in more detail hereinafter with reference to examples but to which the scope is not limited.

DETAILED DESCRIPTION

The illustration in the drawing is schematical. In different drawings, similar or identical elements are provided with the same reference signs.

The term "transmissions" may particularly denote a procedure of transmitting a corresponding data packet or subframe. For instance, any subframe of a sequence of subframes may be considered as such a transmission.

The term "specific transmissions" may particularly denote transmissions of a certain type, for instance transmissions assigned to a specific communication interface connecting two communication partner entities. For instance, transmissions may be classified into transmissions relating to a first interface and transmissions relating to another second interface. Optionally, it is also possible that transmissions can be allocated flexibly either to the first interface or to the second interface.

The term "process" may particularly denote a certain entity for data transmission context handling. The process or process entity handles data received for transmission, e.g. from a higher protocol layer, and controls the transmissions and retransmissions of the data in transmission resources, e.g. in subframes, associated with the process. For instance, one process may comprise a first transmission of certain data and a re-transmission of lost or corrupted data, e.g. as a stop and wait process.

The term "round trip time" (RTT) may particularly denote a time interval from a transmission associated with a process to a subsequent transmission associated with the same process. In the context of HARQ, the round trip time may be the time from a HARQ transmission attempt until the earliest occurrence of a retransmission. Subsequent transmissions for a process occur preferably after one, including more than one (for instance an integer multiple (such as twice of RTT) of RTT, or a non-integer multiple (such as 1.1 times of RTT) of RTT) or at least one, RTT so that feedback, e.g. acknowledgements, for the previous transmission can be considered by the process in the scheduling of the data for transmission.

The term "hybrid automatic repeat request" (HARQ) protocol may particularly denote a technique for an error-free transmission of data packets of a communication message. Previously erroneously transmitted data packets may be requested to be re-transmitted. A data packet recognized as erroneously transmitted may be stored at least partially and may be further processed after re-transmission of the data packet. HARQ may operate as a stop-and-wait mechanism based on confirmations and negative feedback. Two HARQ communication partner devices (such as a mobile communication terminal and a base station) may communicate via a dedicated communication channel. Examples for communication standards featuring a HARQ protocol are IEEE 802.16 (also known as WiMAX), 3GPP standard universal terrestrial radio access (UTRA), high-speed packet access (HSPA), evolved UTRA (E-UTRA), also denoted as long-term evolution (LTE).

According to an embodiment of the invention, a communication between a sender and a receiver is provided in which an efficient handling of a subgroup of specific transmissions among a larger number of transmissions is performed by a procedure which may be represented by virtually sliding a window corresponding to a round trip time over a sequence of the transmissions, and determining how many specific transmissions occur, at the maximum, within the round trip time window. For transmissions with a repetitive configuration, e.g. in configuration intervals of 10 ms or 40 ms, it is sufficient to consider one configuration interval, i.e. slide the window over one interval. Processes associated to the specific transmissions are then managed in accordance with this maximum number. Such a procedure is a simple and efficient way of flexibly administrating a way of transmitting data over a communication interface between sender and receiver, particularly in the context of Automatic Repeat Request processes.

In the following, further embodiments of the method will be explained. However, these embodiments also apply to the sender, to the receiver and to the data carrier comprising software.

In general terms, a method for data transmission from a sender to a receiver is described. The data transmission is performed in predefined time intervals by associated transmission processes. The sender is adapted to perform a subsequent transmission for the associated process in a time interval after one round trip time. Among the transmissions specific transmissions are performed. Alternatively it is also possible to specify specific time intervals among the predefined intervals and perform the method for the specific time intervals. The specific transmissions may be limited to (for instance can only be performed in) a subset of the time intervals, the subset being smaller than the number of all time intervals in a round trip time.

The method may comprise the steps of:
determining a maximum number of specific transmissions within a round trip time;
specifying a number of associated processes for the specific transmissions wherein the specified number is the maximum number; and
associating the processes for the specific transmissions with the specific transmissions.

In an embodiment, the step of associating may be performed such that the same process for the specific transmissions does not occur more than once within a round trip time. This may result in an efficient usage of the communication resources.

In an embodiment, the step of associating comprises:
determining a first of the specific transmissions and attributing a first identification to the selected first specific transmission; and
attributing subsequent identifications to subsequent specific transmissions.

The term "identification" may denote assigning an identifier such as a certain number to individual specific transmissions, thereby allowing for an individualization of a specific transmission via its identification.

Said steps of attributing subsequent identifications may be performed in a modulo operation based on the determined maximum number. A modulo operation finds a remainder of a division of one number by another. This is a computationally simple way of determining identifications.

For example, the first specific transmission may receive an identification, for instance 0, and for each subsequent specific transmission the identification is increased until the maximum number is reached and the identification is set to the starting value for the next specific transmission. Equivalent modulo operations are possible, for instance starting with the maximum number, decreasing the identification for each subsequent specific transmission, and resetting to the maximum number.

The round trip time may be the minimum time from a transmission to a subsequent transmission for the same process, for instance of subsequent data or a re-transmission of lost or corrupted data. Considering processing times the feedback delay may be shorter than an RTT.

The step of determining the maximum number can be performed for instance by calculation of values stored for a configuration of transmissions. It is also possible that the step of determining the maximum number can be performed by a look-up of values stored for a configuration of transmissions, for instance a look-up in a look-up table or a database.

The step of determining may be a selection, for instance of the first or next specific transmission. Such a selection may be made by virtually sliding a window, having a size being indicative of the round trip time, over a sequence of the transmissions, and selecting the maximum number as the maximum number of specific transmissions being simultaneously located within the window during the sliding procedure.

The association, i.e. the step of associating, can also be performed by indicating the intervals k between the transmissions of a process, e.g. by specifying if the first transmission of a process occurs in subframe n then the subsequent transmission of the same process occurs in subframe n+k.

The execution of method may be triggered at any point in time before the first transmission. For instance, the execution of method may be triggered by a configuration or re-configuration message defining the specific transmissions. Thus, management of the specific transmissions may be completed before the actual transmissions start.

The method may further comprise the step of processing data based on the attributed first and subsequent identifications. In particular the data associated with the same identification may be processed in a process associated with the identification.

The method can be performed in the transmitter only, in the receiver only, or both in the transmitter and the receiver. In case the method is performed in one entity (the transmitter or the receiver) only, it may be advantageous that the performing entity signals corresponding data to the other entity. The method allows to specify corresponding specific transmissions, i.e. transmissions with the same attributed identifications. If the method is performed in both the transmitter and the receiver, it allows a synchronization of sender and receiver with respect to the specific transmissions. It is particularly suitable if retransmissions based on the responses are performed in time intervals of corresponding specific transmissions.

The sender may be adapted to perform a subsequent transmission for the associated process in a time interval after a multiple of the round trip time. Such a multiple may be an integer multiple (for instance twice or three times the RTT). Alternatively, such a multiple may be a non-integer multiple (for instance 1.01 or 1.1 the RTT).

In the following, further embodiments of the sender and of the receiver will be explained. However, these embodiments also apply to the method and to the data carrier comprising software.

A sender according to an embodiment of the invention may comprise a transmitter for sending data in predefined time intervals. A processor of the sender may be adapted to identify time intervals among the predefined time intervals which are attributed to specific transmissions. The processor comprises also a unit for determining a maximum number of specific transmissions within a round trip time. A management unit of the sender may be adapted to specify a number of associated processes for the specific transmissions wherein the specified number is the maximum number and to associate the processes for the specific transmissions with the specific transmissions.

A receiver according to an embodiment of the invention may comprise a reception unit for receiving data in predefined time intervals. A processor of the receiver may be adapted to identify time intervals among the predefined time intervals which are attributed to specific transmissions. The processor comprises also a unit for determining a maximum number of specific transmissions within a round trip time. A management unit of the receiver may be adapted to specify a number of associated processes for the specific transmissions wherein the specified number is the maximum number and to associate the processes for the specific transmissions with the specific transmissions.

In this context, the various "units" of the sender and of the receiver may each be individual processors. Alternatively, such units may be parts of a common processor so that multiple units may be integrated into the same processor. The units may also comprise or may have access to a storage resource for storing data.

In the sender and/or the receiver, the corresponding management unit may be adapted for determining a first of the specific transmissions and attributing a first identification to the selected specific transmission. The management unit may then be further adapted for attributing subsequent identifications to the subsequent specific transmissions. A controller of the sender and/or the receiver may be adapted to attribute subsequent identifications in a modulo operation based on the determined maximum number.

In an embodiment, the sender may be a relay node and the specific transmissions may be transmissions by the relay node to a radio access node (for example the receiver). Hence, such an architecture relates to the uplink communication. Alternatively, the sender may be a radio access node and the specific transmissions are transmissions by the radio access node to the relay node (for example the receiver). Such an architecture relates to the downlink communication.

In an embodiment, the receiver may be a radio access node and the specific transmissions are transmissions by a relay node, as sender, to the radio access node, hence relating to uplink communication. Alternatively, the receiver may be a relay node and the specific transmissions are transmissions by a radio access node, as sender, to the relay node, hence relating to downlink communication.

Hence, the sender and the receiver may be configured for managing the handling of the specific transmissions in the above described way in their function as radio access node and relay node. However, a user equipment (which may be communicatively coupled to the relay node) may remain uninfluenced by the adaptation of the communication architecture of radio access node and relay node. Hence, the implementation of the sender and the receiver according to embodiments of the inventions allows to be used in combination with conventional user equipment which does not need to be adapted.

The receiver and/or the sender may execute retransmission processes which are associated with time intervals. In this case, receiver and/or sender generally comprise a memory for storing data during the retransmission process.

The processes may be Automatic Repeat Request (ARQ) processes. ARQ can be considered as a transmission error protection architecture according to which the receiver may request a retransmission when it detects that errors have occurred in a frame. More particularly, the processes may be Hybrid Automatic Repeat Request (HARQ) processes. HARQ may be considered as an advanced ARQ architecture designed to provide error correction and packet retransmission across a wireless interface.

According to an embodiment of the invention, numbering HARQ processes is allowed so that the minimal RTT can be met with a minimum number of HARQ processes. Having such a method allows allocating Un subframes flexibly while reducing or even minimizing the protocol delays. Furthermore, it does not require signaling the HARQ process ID (identifier) explicitly which saves control signaling overhead and ensures backwards compatibility with earlier releases (without relaying).

According to an embodiment of the invention, a method is provided which may be used for example for aligning the number of UL HARQ processes with the Un subframe allocations and thereby to reduce the end-to-end latency and the memory consumption.

Figure 2:
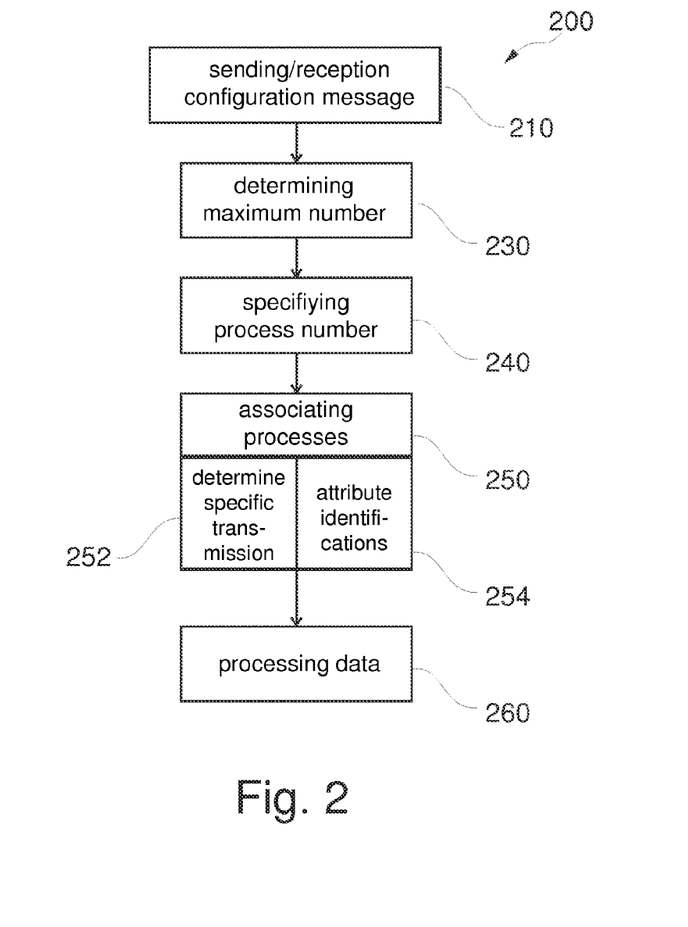
FIG. 2 illustrates a flow chart of a method for data transmission from a sender to a receiver according to an embodiment of the invention.

FIG. 2 illustrates a flow chart showing various procedural steps performed when executing a method 200 for data transmission from a sender to a receiver according to an embodiment of the invention.

In such an embodiment, the data transmission is performed in predefined time intervals (such as blocks of equal-sized transmission time windows) by associated transmission processes (relating to subframes of a sequence of subframes). In the context of such a data transmission system, the sender is adapted to perform a subsequent transmission for the associated process in a time interval after one round trip time. The method is applied in the context of a communication method with a feedback messaging, such as particularly applied in the context of Automatic Repeat Request (ARQ) processes. Specific transmissions, i.e. a subgroup of all transmissions which may be related to a dedicated communication interface, are managed. The specific transmissions are limited to a subset of the time intervals, wherein the subset is smaller than the number of all time intervals in a round trip time.

As can be taken from FIG. 2, particularly the following steps can be carried out in the context of the method 200 which may be executed in the sender or receiver.

A step 210 illustrates sending or reception of a configuration message (or alternatively a reconfiguration message) triggering actual execution of the method 200.

After execution of the method 200 has been triggered, a maximum number of specific transmissions within a round trip time is determined in a determining step 230. This step may be represented by a window corresponding to the round trip time which may be slid over the sequence of time intervals to detect a largest number of specific transmissions falling within the window. However, this step can also be executed by a corresponding calculation or table look-up.

In a specifying step 240 to be performed after the determining step 230, a number of associated processes for the specific transmissions are specified. The specified number is the maximum number. Processes can be assigned to the specific transmissions in accordance with the previously determined maximum number.

Figure 5:
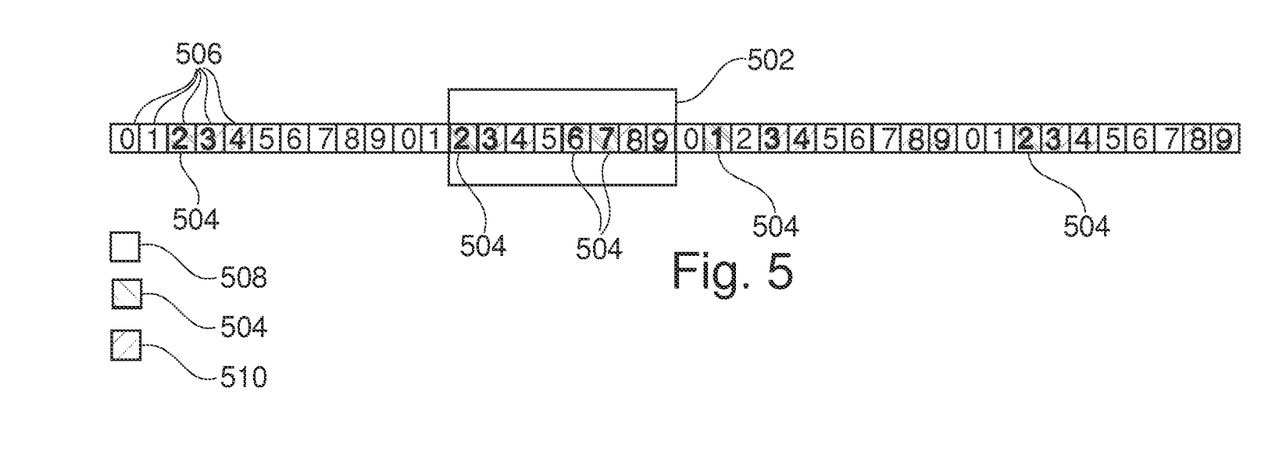
FIG. 5 illustrates a window indicating a round trip time sliding over 40 ms Un subframe configuration period, wherein the numbering indicates the subframes within a radio frame, according to an embodiment of the invention.
Figure 6:
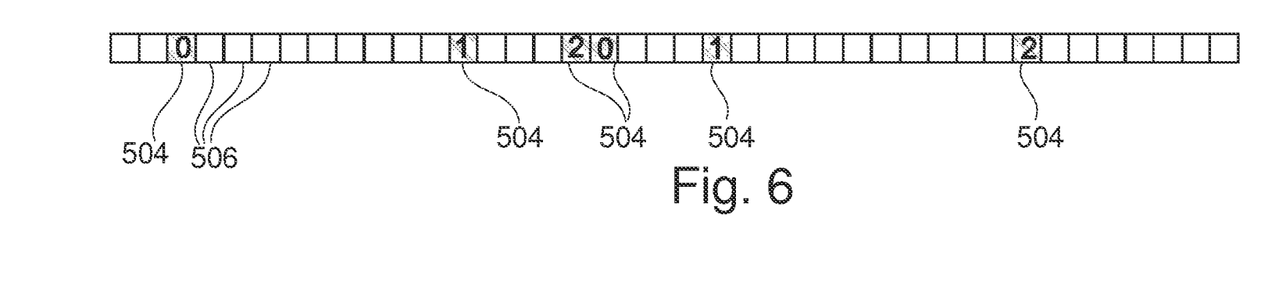
FIG. 6 illustrates a numbering of Un subframes with modulo operation, wherein numbering indicates the UL HARQ process identification, according to an embodiment of the invention.

In a subsequent associating step 250, the processes for the specific transmissions are associated with the specific transmissions. More precisely, the associating step 250 may comprise, as indicated with reference numeral 252, determining a first of the specific transmissions. Subsequently, a first identification is attributed to the determined first specific transmission. Referring to reference numeral 254, subsequent identifications are attributed to the subsequent specific transmissions. For instance, said steps of attributing 254 subsequent identifications are performed using a modulo operation based on the determined maximum number. FIG. 5 and FIG. 6 give an explicit example for this.

In a subsequent processing step 260, the process execution for processing data for sending and/or receiving in a data transmission is controlled based on the attributed first and subsequent identifications.

The method 200 can be terminated after this processing, or can be continued.

In the following, referring to FIG. 3, a sender 110 according to an embodiment of the invention will be explained.

Furthermore, referring to FIG. 4, a corresponding receiver 120 according to an embodiment will be explained. Sender 110 and receiver 120 may also be denoted sender device and receiver device, respectively.

Figure 3:
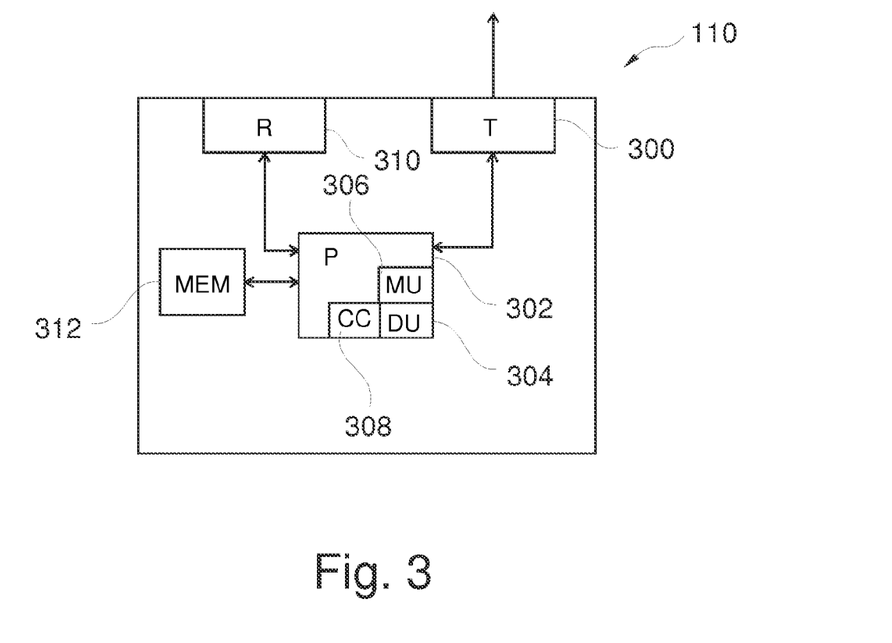
FIG. 3 illustrates a block diagram of a sender according to an embodiment of the invention.
Figure 4:
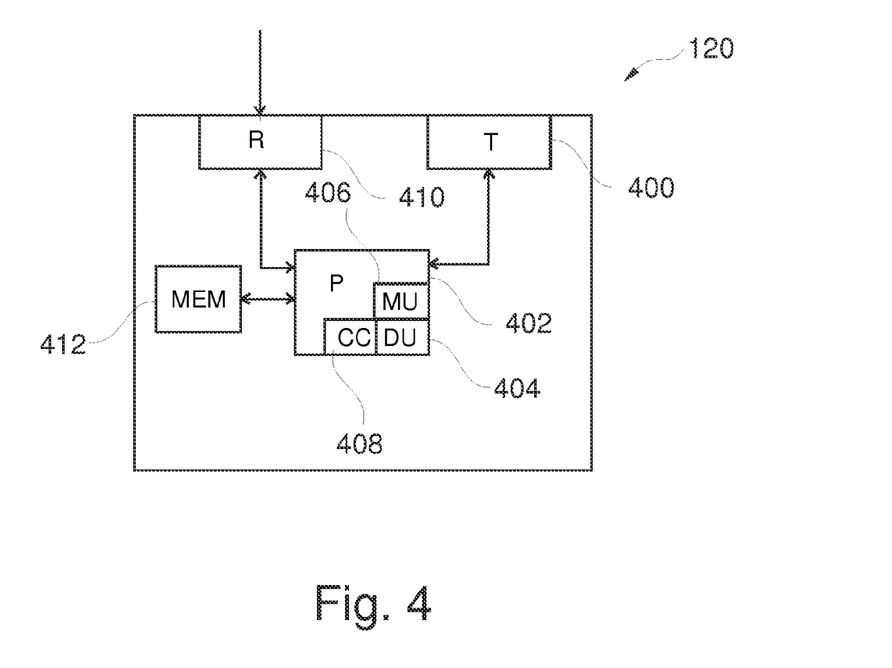
FIG. 4 illustrates a block diagram of a receiver according to an embodiment of the invention.

The sender 110 shown in FIG. 3 and the receiver 120 shown in FIG. 4 may be configured for mutual communication. Hence, the sender 110 and the receiver 120 may together form (or form part of) a communication system for a bidirectional communication according to an embodiment of the invention.

Again referring to FIG. 3, the sender 110 comprises a transmitter 300 for sending data in predefined time intervals. The data may be sent as packages of a certain length in time, thereby transmitting subframes or the like to one or more receivers 120.

The sender 110 furthermore comprises a processor 302 which is adapted to identify time intervals among the predefined time intervals which are attributed to specific transmissions. The specific transmissions may for instance be the transmissions which can be sent via the transmitter 300 to a specific receiver 120. Hence, the specific transmissions may indicate a certain type and therefore subset of all generally available transmissions.

The processor 302 furthermore comprises a determining unit 304 for determining a maximum number of the specific transmissions which may occur at maximum within a round trip time.

Furthermore, a management unit 306 of the sender 110 is provided and is adapted to specify a number of associated processes for the specific transmissions. The specified number is the maximum number. The management unit 306 is further adapted to associate the processes for the specific transmission with the specific transmissions or corresponding time intervals. Thus, certain processes (for instance in the context of a HARQ procedure) may be assigned to the various specific transmissions. Thus, for each of the specific transmissions, a corresponding process is assigned, and may be uniquely identified by a corresponding identification. More specifically, the management unit 306 may be adapted for determining a first of the specific transmissions and attributing a first identification (such as the number 0) to the selected specific transmission. Furthermore, the management unit 306 can be adapted for attributing subsequent identifications (such as 1, 2, 3) to subsequent specific transmissions (i.e. second to fourth specific transmissions).

Moreover, the sender 110 comprises a calculation controller 308 which is adapted to attribute the above-mentioned subsequent identifications in a modulo operation based on the determined maximum number. This may result in the above example in a sequence of process identifications such as 0, 1, 2, 3, 0, 1, 2, 3, 0, . . . .

With such an architecture, the sender 110 is capable of executing retransmission processes which are associated with time intervals.

As can furthermore be taken from FIG. 3, a reception unit 310 is provided as well which is capable of receiving communication messages from a communicatively coupled partner, e.g. (H)ARQ feedback or messages exchanged in configuration or reconfiguration procedures. Such a communicatively coupled partner may be the transmitter 120.

Hence, in embodiments, each of the sender 110 and the receiver 120 may in fact be operated as a sender/receiver.

Furthermore, the processor 302 is bidirectionally coupled to a memory 312 which may store data accessible for the processor 302 in the context of the above-described tasks. The processor 302 may read data from the memory 312 and may write data into the memory 312.

The receiver 120 shown in FIG. 4 comprises a reception unit 410 for receiving data in predefined time intervals. When being coupled with the sender 110, the reception unit 410 may receive the data from the sender 110, more precisely from the transmitter 300 thereof.

Furthermore, the receiver 110 comprises a processor 402 which is adapted to identify time intervals among the predefined time intervals which are attributed to specific transmissions.

The processor 402 additionally comprises a determining unit 404 for determining a maximum number of specific transmissions within a round trip time. This procedure can be performed in a similar manner as described above with regard to processor 302 in the sender 110.

Moreover, again similarly to the sender 110, also the receiver 120 comprises a management unit 406 adapted to specify a number of associated processes for the specific transmissions, wherein the specific number is the maximum number. The management unit 406 is further configured to associate the processes for the specific transmissions with the specific transmissions.

The precise operation of the processor 402 is similar to the operation of the processor 302. The precise operation of the management unit 406 is similar to the precise operation of the management unit 306.

Furthermore, the receiver 120 also comprises a memory 412 which is similarly configured and operable as the memory 312 in FIG. 3. Moreover, a controller 408 attributes subsequent identifications in a modulo operation based on the determined maximum number, as the controller 308 does.

Moreover, also the receiver 120 comprises a transmitter 400 which is capable of transmitting data to a communicatively coupled entity such as the sender 110.

In an embodiment, the sender 110 as shown in FIG. 3 is used within the communication scheme shown in FIG. 1 as relay node 10. Moreover, the receiver 120 shown in FIG. 4 be implemented as radio access node 20 (or evolved NodeB) in FIG. 1 according to an embodiment of the invention. Hence, the described sender—receiver architecture relates to the communication link UL RN-eNB of FIG. 1.

By taking these measure, the communication between the entities 110, 120 is rendered very flexible. Moreover, this has the advantage that the user equipment (UE) 30 in FIG. 1 does not need to be reconfigured. Therefore, the interfaces for the communication of the user equipment 30 need not to be amended or changed, since the only changes as compared to the conventional architecture are performed in the communication between entities 10 and 20, resulting in the architecture of communication between the sender 110 and receiver 120.

In terms of an LTE transmission system, an embodiment of the invention may be implemented for example in a relay node and in an eNodeB. The method is particularly suitable for the numbering of UL HARQ processes. However, it should be noted that embodiments of the invention are not limited to such a system or scenario.

In LTE the minimum RTT, i.e. the time from a HARQ transmission attempt until the earliest occurrence of a retransmission, may be 8 ms, even when supporting relays and for TDD. Consequently, 8 HARQ processes are required in this example to fully utilize the link if all subframes can be used for transmission. In the case of in-band relaying, i.e. if the relay nodes send and receive in the same frequency band, less HARQ processes are needed. Having assigned Un subframes according to 10 ms or 40 ms period the largest number of Un subframes within a sliding window with the size of the RTT (here 8 ms) is the number of HARQ processes needed for continuous transmission. The 10 ms or 40 ms period can be configured by higher layer signaling for configuration of the backhaul subframes.

FIG. 5 illustrates an example FDD (frequency division duplex) configuration with 40 ms period (4 radio frames with 10 subframes each). Altogether, forty subframes 506 are shown each of which may be used for a transmission. Up to 24 subframes may be allocated to Un. FIG. 5 shows a sequence of consecutive UL subframes with a length of 1 ms each identified by the subframe number. Six subframes are actually allocated to Un, which are marked with reference numeral 504. In general terms, a transmission over the Un interface may be denoted as a specific transmission. Non-Un subframes are marked with reference numeral 510 and can only be attributed to UE transmissions. Subframes 508 are also attributed to UE transmissions but can, depending on the traffic requirements, also be designated as Un frames, i.e. be allocated to the Un link, for instance by reconfiguration. A window 502 of round trip time, here e.g. 8 ms, can slide across the subframes 506 in order to detect the maximum number of Un subframes 504 within the window 502 in the present configuration. The maximum number of Un subframes 504 within the window is three (compare position of window 502 in FIG. 5). So at least 3 UL HARQ processes are needed to fully utilize the Un link.

In mathematical terms the number of HARQ process $N_{HARQ}$ can be calculated as follows:

$$N_{HARQ} = \max_{i=0 \ldots N-RTT} \sum_{j=i}^{i+RTT} Un \text{ subframes}$$

where N is the Un subframe allocation period (for instance, 10 or 40) and RTT is the minimum RTT (for instance, 8).

If $N_{HARQ}$ is known, Un subframes 504 can be associated to HARQ process IDs by means of sequential numbering using the modulo operation based on $N_{HARQ}$.

FIG. 6 shows for the above example an attribution of HARQ process IDs of Un subframes 504 by sequential numbering. Modulo operation based on $N_{HARQ}=3$ is applied to process IDs. The HARQ process ID is incremented for each occurrence of a Un subframe 504 and not only if a transmission takes place. This is advantageous in order to maintain synchronization between the transmitting and receiving endpoint. It should also be noted that it is not required that both the sender and the receiver of a subframe need to use the same identification for their respective HARQ process but it is generally sufficient that each subframe is uniquely associated to a local process.

The shown embodiment does not require to indicate the HARQ process ID explicitly even though the time between two consecutive occurrences of a HARQ process is not constant. However, based on the given Un subframe 504 allocation and the number of HARQ processes, both endpoints can determine the HARQ processes to be used unambiguously. Therefore, it can be referred to as a synchronous HARQ protocol with respect to the HARQ processes, even if it is not synchronous with respect to the transmission times.

In an embodiment, when Un subframes 504 are allocated such that the number of Un subframes 504 within the allocation period (here 6) is an integer multiple of $N_{HARQ}$ (here 3) then the numbering of HARQ processes follows the same period as the Un subframe 504 allocation (here 40).

Hence, the round trip time indicated as window 502 in FIG. 5 is shifted along the sequence of transmissions or subframes 506 in FIG. 5. The maximum number of specific transmissions 504 only (i.e. not the transmissions 508, 510 of different type) within the round trip time 502 block is determined, which is the number 3 in the present case. Now referring to FIG. 6, an identification is assigned to each specific transmission 504 in the sequence of subframes 506. The number of different identifications equals to the maximum number 3 estimated beforehand. Here, the identifications chosen are 0, 1 or 2. After having determined these identifications, they are assigned to the sequence of specific transmissions 504 in FIG. 6. In accordance with the number of three different HARQ processes involved, the three identifications 0, 1 and 2 are repeated twice as shown in FIG. 6.

More particularly, a computer-readable medium (for instance a CD, a DVD, a USB stick, a harddisk or any other memory) is provided, in which a computer program is stored which, when being executed by a processor (such as a microprocessor or a CPU), is adapted to control or carry out a method having the above mentioned features.

Data processing which may be performed according to embodiments of the invention can be realized by a computer program, that is by software, or by using one or more special electronic optimization circuits, that is in hardware, or in hybrid form, that is by means of software components and hardware components.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A method for data transmission from a sender to a receiver, the method comprising:
    performing the data transmission from the sender to the receiver in predefined time intervals by one or more processes, the sender being adapted to perform a subsequent transmission for a process in a time interval after one round trip time;
    performing specific transmissions from the sender to the receiver among the data transmission, the specific transmissions being limited to a subset of the predefined time intervals, the subset being smaller than the number of all the time intervals in a round trip time, wherein the round trip time comprises the time from one transmission for a process to a subsequent transmission for the same process;
    determining a maximum number of the specific transmissions within the round trip time;
    specifying a number of processes for the specific transmissions, wherein the specified number of the processes comprises the maximum number; and
    associating the processes for the specific transmissions with the specific transmissions, wherein the one or more processes and the associated processes comprise Automatic Repeat Request processes or Hybrid Automatic Repeat Request processes.

2. The method of claim 1, wherein the specific transmissions are transmissions which can only be performed in the subset of the time intervals.

3. The method of claim 1, wherein the specific transmissions are defined in terms of specific time intervals.

4. The method of claim 1, wherein the associating is performed such that the same process for the specific transmissions does not occur more than once within a round trip time.

5. The method of claim 1, wherein the associating comprises:
   determining a first of the specific transmissions;
   attributing a first identification to the determined specific transmission;
   attributing subsequent identifications to the subsequent specific transmissions, wherein the attributing subsequent identifications are performed in a modulo operation based on the determined maximum number.

6. The method of claim 5, further comprising processing data based on the attributed first and subsequent identifications.

7. The method of claim 1, wherein the sender is adapted to perform a subsequent transmission for the associated process in a time interval after a multiple of the round trip time.

8. The method of claim 1, wherein the determining the maximum number is performed by calculation or look-up of values stored for a configuration of transmissions.

9. The method of claim 1, wherein the determining is a selection.

10. The method of claim 1, wherein execution of the method is triggered by a configuration message or a re-configuration message defining the specific transmissions.

11. The method of claim 1, wherein the method is performed both in the sender and the receiver.

12. A sender, comprising:
   a transmitter configured to send data in predefined time intervals;
   a processor configured to identify time intervals among the predefined time intervals which are attributed to specific transmissions, wherein the processor comprises a determining unit configured to determine a maximum number of specific transmissions within a round trip time, wherein the round trip time comprises the time from one transmission for a process to a subsequent transmission for the same process; and
   a management unit configured to:
      specify a number of processes for the specific transmissions, wherein the specified number is the maximum number; and
      associate the processes for the specific transmissions with the specific transmissions, wherein the processes comprise Automatic Repeat Request processes or Hybrid Automatic Repeat Request processes.

13. The sender of claim 12, adapted as a relay node, wherein the specific transmissions are transmissions by the relay node to a radio access node.

14. The sender of claim 12, wherein the management unit is configured to:
   determine a first of the specific transmissions;
   attribute a first identification to the determined specific transmission; and
   attribute subsequent identifications to the subsequent specific transmissions.

15. The sender of claim 14, wherein the sender is configured to attribute subsequent identifications in a modulo operation based on the determined maximum number.

16. The sender of claim 12, wherein the sender is configured to execute retransmission processes which are associated with time intervals.

17. A receiver, comprising:
   a reception unit configured to receive data in predefined time intervals;
   a processor configured to identify time intervals among the predefined time intervals which are attributed to specific transmissions, wherein the processor comprises a determining unit configured to determine a maximum number of specific transmissions within a round trip time, wherein the round trip time comprises the time from one transmission for a process to a subsequent transmission for the same process;
   a management unit configured to:
      specify a number of processes for the specific transmissions, wherein the specified number is the maximum number;
      associate the processes for the specific transmissions with the specific transmissions, wherein the processes comprise Automatic Repeat Request processes or Hybrid Automatic Repeat Request processes.

18. The receiver of claim 17, adapted as a radio access node, wherein the specific transmissions are transmissions by a relay node to the radio access node.

19. The receiver of claim 17, wherein the management unit is configured to:
   determine a first of the specific transmissions;
   attribute a first identification to the determined specific transmission;
   attribute subsequent identifications to the subsequent specific transmissions.

20. The receiver of claim 19, wherein the sender is configured to attribute subsequent identifications in a modulo operation based on the determined maximum number.

21. The receiver of claim 17, wherein the sender is configured to execute retransmission processes which are associated with time intervals.

22. A computer program product stored in a non-transitory computer readable medium for controlling data transmission from a sender to a receiver, wherein the data transmission is performed in predefined time intervals by one or more processes, the sender being adapted to perform a subsequent transmission for a process in a time interval after one round trip time, wherein specific transmissions are performed among the transmissions, wherein the specific transmissions are limited to a subset of the time intervals, the subset being smaller than the number of all time intervals in a round trip time, the computer program product comprising software instructions which, when run on the sender or receiver, causes the sender or receiver to:
   determine a maximum number of specific transmissions within a round trip time, wherein the round trip time comprises the time from one transmission for a process to a subsequent transmission for the same process;
   specify a number of processes for the specific transmissions, wherein the specified number is the maximum number; and
   associate the processes for the specific transmissions with the specific transmissions, wherein the one or more processes and the associated processes comprise Automatic Repeat Request processes or Hybrid Automatic Repeat Request processes.

* * * * *

UNITED STATES PATENT AND TRADEMARK OFFICE
CERTIFICATE OF CORRECTION

PATENT NO. : 9,204,314 B2  
APPLICATION NO. : 13/640778  
DATED : December 1, 2015  
INVENTOR(S) : Hoymann et al.

Page 1 of 1

It is certified that error appears in the above-identified patent and that said Letters Patent is hereby corrected as shown below:

In the drawings

In Fig. 2, Sheet 1 of 3, for Step "240", in Line 1, delete "specifiying" and insert -- specifying --, therefor.

In the specification

In Column 1, Line 54, delete "$SC_m$" and insert -- $SC_m$ --, therefor.

In Column 1, Line 56, delete "$SC_m$" and insert -- $SC_m$ --, therefor.

In Column 9, Line 60, delete "transmitter 120." and insert -- transmitter 300. --, therefor.

In Column 10, Line 6, delete "receiver 110" and insert -- receiver 120 --, therefor.

Signed and Sealed this  
Twelfth Day of April, 2016

Michelle K. Lee  
*Director of the United States Patent and Trademark Office*